March 10, 1942.　　　S. K. PRENTICE　　　2,276,063
COMBINED SCREEN AND VENTILATOR
Filed March 6, 1940
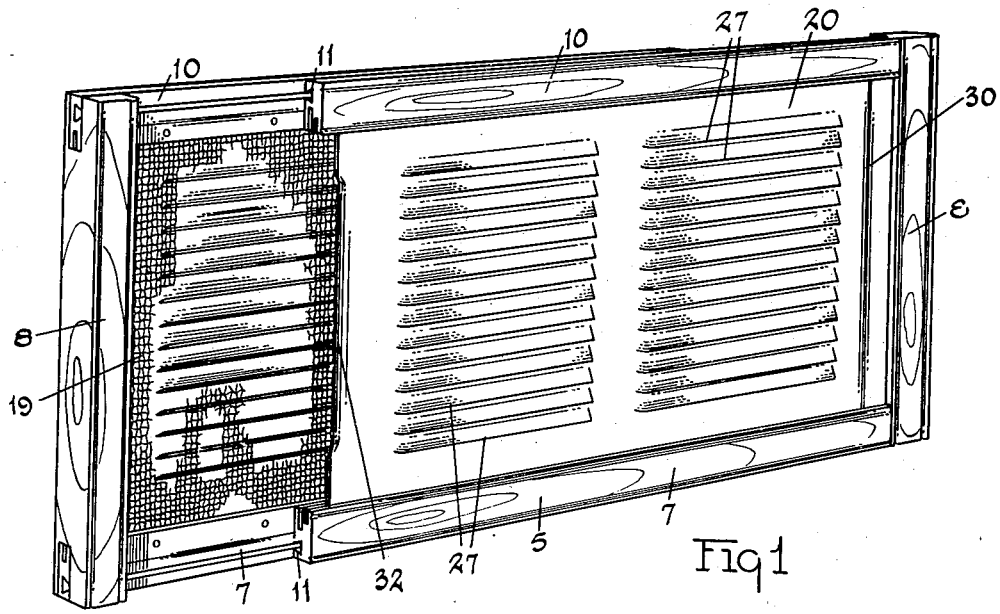
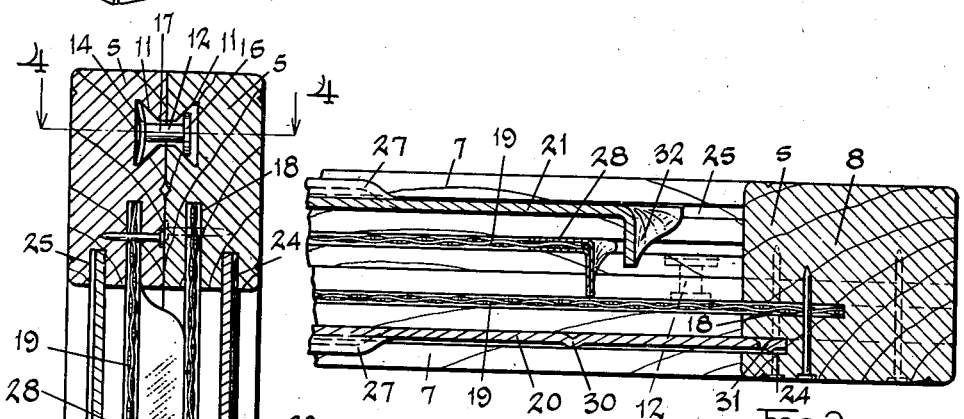
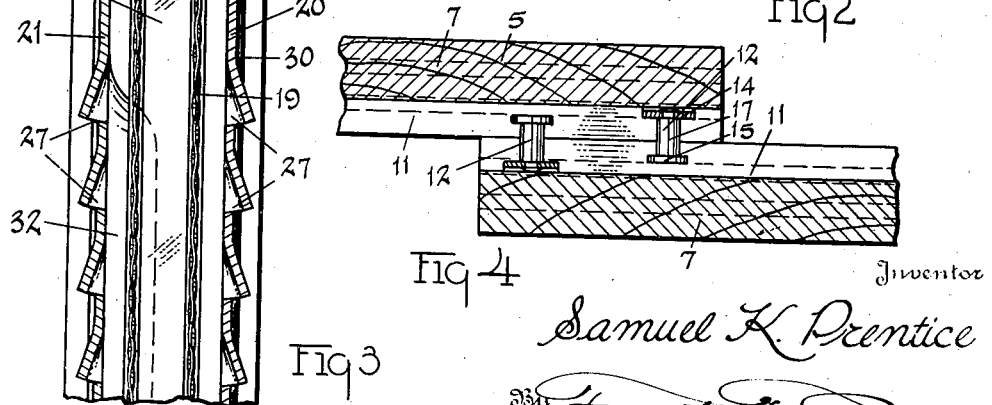

Patented Mar. 10, 1942

2,276,063

UNITED STATES PATENT OFFICE 2,276,063

COMBINED SCREEN AND VENTILATOR

Samuel K. Prentice, Adrian, Mich.

Application March 6, 1940, Serial No. 322,541

1 Claim. (Cl. 98—99)

My invention has for its object to provide a collapsible screen and ventilator comprising two three-sided wooden frames having registering fan-tailed grooves in the opposite wooden sides and members, having heads and bases connected together by shanks, located in the grooves of the frames to produce readily slidable connections between the frames.

The invention, also, provides ventilator plates, removably slidable in slots formed in a pair of three-sided wooden frames and having reenforcing beads extending crosswise near one end of each plate to prevent central sagging when the ventilator parts are inserted in position in the slots formed in the wooden sides that form the ends of the frames and inwardly extending lugs located in said ends of the ventilator plates for engaging the frames in the slots formed in the said ends of the frames.

The invention, also, consists, in a pair of relatively slidable frames, each having three wooden sides and wire screens located therein, the edge of each screen free from a wooden side of the frame covered by a looped sheet metal strip for binding the end edge of the screen, the strip being bent angular and extending to the other screen for preventing entry of insects between the screens.

The invention may be contained in structures of different forms and, to illustrate a practical application of the invention, I have selected a combined screen and ventilator as an example of a construction containing the invention and shall describe the screen and ventilator hereinafter. The screen and ventilator is shown in the accompanying drawing.

Fig. 1 is a perspective view of a combined screen and ventilator. Fig. 2 is a view of a longitudinal section of a part of the screen and ventilator. Fig. 3 is a transverse section of a side part of the screen and ventilator. Fig. 4 is a view of a section taken on the plane of the line 4—4, indicated in Fig. 3, to illustrate the means for slidably securing the frame parts of the screen and ventilator.

The screen and ventilator, shown in the figures, is provided with a pair of three-sided frames 5 that are slidably connected together in order that the frame may be extended or collapsed to fit desired areas within a window casing. Each frame 5 is formed of three wooden sides 7, 8, and 10. The sides 7 and 10 of each frame are provided with registerable fan-tailed grooves 11, in which are located members 12. Each member has a base 14 and a head 15, which are connected together by a shank 17. The base 14 is formed of a size such that it may tightly fit in the groove 11 of one of the frames, while the head 15 is loosely located in the fan-tailed groove 11 of the other frame. The members are located at spaced points in the grooves of the two frames and in the sides 7 and 10, whereby one frame may be readily slid along the other frame and held by the members 12.

The frames 5, also, have slots, in which edge portions of screens 19 may be located and fastened by a suitable means, such as by nails. Also, louvered plates 20 and 21 are located at the sides of the screens and exterior thereto and located in slots 24 and 25. Thus, the plates 20 and 21 may be slidably movable in the slots 24 and 25 formed in the sides 7 and 10 of each of the frames and their end edges inserted in the slot 24 of the side 8 of each of the frames. The plates may be readily removed from the frames or inserted in position when the temperature becomes a little cool, such as in the early summer or the late fall, in order to provide for ventilation through the screen. The plates 20 and 21 are provided with louvered openings 27 to allow free movement of the air through the plates and to direct the air, preferably, downward to prevent direct draft.

The end of each screen, not connected to any of the sides, is enclosed by looped sheet metal strips 28 that cover the end edges of the screens and the looped plates are bent at right angles to the body portions of the screens and toward the opposite screen of the other frame to prevent insects from passing between the screens and into the building in which the screens are located.

The louvered plates 20 and 21 have, at their ends, beads 30 for preventing the plates from sagging or getting out of line of the slots 24 as they are moved toward the cross wooden frame part 8. The plates 20 and 21 are, also, provided with lugs 31 that are pressed outward so as to engage the side surface of the slots 24 of the sides 8 as they are pushed into the slot and, thus, are engaged and held in the slots 24 of the end parts 8 of the frame, as well as in the slots 24 of the side parts 7 and 10 of the frames. The plates 20 and 21 are angularly bent, as at 32, toward the screens, at the ends not connected to the wooden sides, to reenforce the end edges and enable ready manipulation of the plates upon insertion or withdrawal thereof.

I claim:

A pair of frames slidably connected together and each having three wooden side parts, wire screens secured in each frame; sheet metal strips for binding and covering the opposite surfaces of one end part of each of the screens; the binding metal strips at the said ends of each of the screens bent to the other screen to prevent entry of insects between the screens; each frame having slots in said sides; a pair of sheet metal louvered plates insertable and slidably movable in the slots and located outside of the screens; the end parts of the louvered plates having transversely extending beads for preventing sagging of the end parts of the louvered plates to readily direct the said ends of the plates to the slots of the ends of the frames; and the other end edge of each louvered plate bent toward its juxtaposed screen and in close storm-confining relation with respect to the binding metal strips.

SAMUEL K. PRENTICE.